(12) United States Patent
Binder et al.

(10) Patent No.: US 11,799,257 B2
(45) Date of Patent: Oct. 24, 2023

(54) SLIP RING, SLIP RING UNIT, ELECTRIC MACHINE, AND WIND TURBINE

(71) Applicant: Flender GmbH, Bocholt (DE)

(72) Inventors: Herbert Binder, Neuburg (DE); Robert Gruber, Ruhstorf (DE); Oliver Memminger, Neuburg a. Inn (DE); Roman Svach, Luhacovice (CZ)

(73) Assignee: Flender GmbH, Bocholt (DE)

( * ) Notice: Subject to any disclaimer, the term of this patent is extended or adjusted under 35 U.S.C. 154(b) by 241 days.

(21) Appl. No.: 17/263,458

(22) PCT Filed: Jul. 17, 2019

(86) PCT No.: PCT/EP2019/069247
§ 371 (c)(1),
(2) Date: Jan. 26, 2021

(87) PCT Pub. No.: WO2020/020723
PCT Pub. Date: Jan. 30, 2020

(65) Prior Publication Data
US 2021/0218211 A1    Jul. 15, 2021

(30) Foreign Application Priority Data
Jul. 27, 2018   (EP) ..................................... 18186108

(51) Int. Cl.
*H01R 39/08*   (2006.01)
*H02K 13/00*   (2006.01)
*F03D 9/25*    (2016.01)

(52) U.S. Cl.
CPC ............... *H01R 39/08* (2013.01); *F03D 9/25* (2016.05); *H02K 13/003* (2013.01)

(58) Field of Classification Search
CPC .................................... H02K 9/28; H02K 9/06
See application file for complete search history.

(56) References Cited

U.S. PATENT DOCUMENTS 3,876,998 A * 4/1975 Richter .................. G01K 13/08
340/870.31
8,373,299 B2   2/2013 Sharples et al.
(Continued)

FOREIGN PATENT DOCUMENTS

DE          307969 C  *  8/1915
DE          307969 C     2/1919
(Continued)

OTHER PUBLICATIONS

DE-102006058911-B4_translate (Year: 2008).*
(Continued)

*Primary Examiner* — Tulsidas C Patel
*Assistant Examiner* — Mohammed Ahmed Qureshi
(74) *Attorney, Agent, or Firm* — Henry M. Feiereisen LLC

(57) ABSTRACT

A slip ring, in particular for use in a wind turbine, includes an axle extending in an axial direction and a contact region having a contact surface on a peripheral surface of the contact region and a recess extending in a tangential circumferential direction along the peripheral surface. The contact region includes an axial end face formed with an opening which communicates with the recess. The contact region includes three essentially cylindrical segments which define two covering segments and an intermediate segment arranged in a center between the two covering segment. Each of the two covering segments defines a radius which is larger than a radius of the intermediate segment so that a peripheral surface of the intermediate segment forms an underside of the recess. An insulating region is arranged adjacent to the contact region on the axle.

20 Claims, 3 Drawing Sheets

(56) References Cited

U.S. PATENT DOCUMENTS

2012/0200194 A1     8/2012    Schwery et al.
2017/0328352 A1    11/2017    Kluemper et al.

FOREIGN PATENT DOCUMENTS

| | | | | |
|---|---|---|---|---|
| DE | 496818 | C | 4/1930 | |
| DE | 1026844 | B * | 3/1958 | ............ H02K 9/28 |
| DE | 2056898 | A1 | 5/1972 | |
| DE | 2529519 | A1 | 1/1977 | |
| DE | 10003900 | A1 | 5/2002 | |
| DE | 102006058911 | B4 * | 10/2008 | ............ H01R 39/08 |
| DE | 10 2009 048 265 | A1 | 4/2011 | |
| EP | 2887509 | A1 * | 6/2015 | ............ H02K 9/28 |
| EP | 2 961 009 | A1 | 12/2015 | |
| EP | 3 032 704 | | 6/2016 | |
| EP | 3 322 047 | A1 | 5/2018 | |
| FR | 487580 | A | 7/1918 | |
| JP | S5769682 | A | 4/1982 | |
| WO | WO-2016165939 | A1 * | 10/2016 | ............ H01R 39/08 |

OTHER PUBLICATIONS

DE307969C_translate (Year: 1915).*
DE1026844B _translate (Year: 1958).*
WO-2016165939-A1_translate (Year: 2016).*
EP-2887509-A1_translation (Year: 2015).*
PCT International Search Report and Written Opinion of International Searching Authority dated Oct. 22, 2019 corresponding to PCT International Application No. PCT/EP2019/069247 filed Jul. 17, 2019.

\* cited by examiner

SLIP RING, SLIP RING UNIT, ELECTRIC MACHINE, AND WIND TURBINE

CROSS-REFERENCES TO RELATED APPLICATIONS

This application is the U.S. National Stage of International Application No. PCT/EP2019/069247, filed Jul. 17, 2019, which designated the United States and has been published as International Publication No. WO 2020/020723 A1 and which claims the priority of European Patent Application, Serial No. 18186108.9, filed Jul. 27, 2018, pursuant to 35 U.S.C. 119(a)-(d).

BACKGROUND OF THE INVENTION

The invention relates to a slip ring and a slip ring unit. The invention further relates to an electric machine and a wind turbine.

Large electric machines, in particular generators for wind turbines, at times comprise slip ring units for transmitting electrical energy from a stationary unit to a rotor.

Slip ring units often transmit high currents. Slip rings are therefore exposed to intense thermal loads, in particular when energy quantities in the megawatt range are transmitted. It is therefore necessary to cool the slip ring units.

One possibility for cooling the slip ring unit or the slip ring is an additional fan (forced ventilation). This is however complex and increases the size of a slip ring unit considerably.

Further measures for cooling, such as are proposed in EP 3 322 047 A1 are often insufficient especially when large quantities of electrical energy are transmitted.

DE 496 818 C discloses a slip ring unit with self-ventilation, in which the cross section of a slip ring head is embodied from a triangle and a channel, wherein the slip ring head is connected to the narrower connecting piece that receives the power supply lines through a trapezoidal neck piece and long and narrow cooling ducts are preferably guided from the flanks of said neck piece to the channel.

An arrangement of cooling ducts on a slip ring is also disclosed in FR 487 580 A.

DE 25 29 519 A1 discloses an air-cooled slip ring having annular sectors that are connected to passages on the inner edge of the annular sectors.

DE 307 969 C discloses an arrangement for cooling slip rings, wherein the rings are provided with axial ducts and are provided with radial slots on both sides of the rings. One of the radial slots has fan blades, the other does not.

The object of the invention is therefore to provide a slip ring or a slip ring unit in which the cooling is improved.

SUMMARY OF THE INVENTION

The object is achieved by a slip ring as set forth hereinafter. The object is further achieved by a slip ring unit as as set forth hereinafter. An electric machine and a wind turbine having such a slip ring also achieve the object.

The invention is based on the knowledge that a slip ring greatly heats up contact regions, preferably contact regions that are embodied from a material that conducts electricity effectively such as bronze or stainless steel, when large electrical powers are received and are therefore to be cooled with as large as possible an area. In this regard, the contact regions have a recess that is embodied in a tangential manner, wherein the recess contributes on the one hand to enlarging the area that is to be cooled. On the other hand, the recess can contribute to the generation of an airflow that extends radially. The airflow that extends radially is used to cool slip ring elements. It is preferred that the slip ring elements are also embodied in a two-part manner and/or with a recess. The slip ring element has additional surfaces in particular owing to a two-part embodiment of the slip ring element and said additional surfaces can be cooled by an airflow. The slip ring elements are preferably embodied as slip ring brushes. The slip ring elements can be cooled particularly effectively by the airflow that extends radially.

The slip ring is used in particular in a wind turbine. The slip ring comprises at least one contact region and insulating regions, wherein the insulating regions and the contact regions are arranged adjacent to one another on an axle, wherein the respective contact region has a contact surface on the peripheral surface of said contact region, wherein the contact region has a recess that extends in the tangential direction, wherein the respective axial end face of the contact region has openings, in particular in an annular surface, characterized in that the openings in each case lead into the recess.

The insulating regions are preferably embodied from a plastic or a ceramic material. It is preferred that the insulating regions are arranged in each case on the end faces of the respective contact region.

It is preferred that a slip ring comprises three contact regions for three electrical phases and four insulating regions. The contact regions and the insulating regions are arranged in such a manner that the respective contact region is separated in each case from an insulating region. An insulating region is further advantageously arranged on the axial end faces of the contact regions.

It is preferred that the contact regions and the insulating regions are fastened to one another. A clamping connection, a screw connection or an adhesive connection is suitable as a fastening means.

Furthermore, the respective contact region and the respective insulating region have a hole that is arranged centrally for receiving the axle.

The respective contact region is preferably embodied as cylindrical, wherein the peripheral surface of the contact region embodies the contact surface. The contact surface is preferably produced from a material that conducts electricity effectively.

The contact surfaces are embodied in such a manner that the slip ring elements can be applied to said contact surfaces. The respective contact region has the recess, preferably in the axial center. The recess extends preferably in the tangential direction around the peripheral surface. The recess is preferably embodied with an essentially rectangular cross section.

The recess divides the contact surface of the respective contact region into two contact surfaces that are spaced from one another by the recess in the axial direction. The respective contact surface preferably has a groove that extends in the axial direction. The groove is preferably used so as to remove dust. Moreover, a groove in the contact surface improves the cooling of the contact surface.

The openings preferably extend in the axial direction. The openings preferably form an axial access to the recess. The openings are preferably positioned in the annular surface. The openings are in each case spaced from one another in the tangential direction.

The openings are used so as to transmit an airflow, which extends in the axial direction, into the recess. The recess is used preferably so as to branch off a portion of the airflow in order to divert the portion into the radial direction.

Shaped areas that are arranged on an underside of the recess can support an airflow in the radial direction through the recess.

The recess preferably has a depth in the axial direction. The depth of the recess corresponds approximately to the difference between the radii of the respective contact region and the insulating region.

It is possible owing to the invention to improve the cooling of the slip ring. Furthermore, the slip ring elements can be cooled from their underside.

The improved cooling renders it possible to provide a more compact and therefore lighter embodiment of the slip ring.

In one advantageous embodiment of the invention, the contact regions adjoin an insulating region on their end face.

It is preferred that the contact regions and the insulating regions are in each case formed as cylinders. The cylinders are arranged contacting one another on the axle, it is preferred that the insulating regions and the contact regions are in each case fixedly connected to one another.

Alternatively, at least one of the contact regions can be fastened to an insulating region. In this embodiment, the respective contact region is embodied as annular and is placed on a section of an insulating region, wherein in the contact region the insulating region has an outer diameter that corresponds approximately to the inner diameter of the annular insulating region.

It is preferred that the insulating regions have openings, wherein the respective opening is provided so as to implement an electrical contacting arrangement of a contact element to the respective contact region.

The slip ring is embodied in a particularly compact and stable manner in particular owing to the adjoining arrangement of the insulating regions and the contact regions.

In a further advantageous embodiment of the invention, the respective contact region is arranged on the peripheral surface of the respective insulating region.

At least one of the contact regions can be fastened to an insulating region. In this embodiment, the respective contact region is embodied as annular and is placed on a section of an insulating region, wherein in the contact region the insulating region has an outer diameter that corresponds approximately to the inner diameter of the annular insulating region. It is preferred that the contact region is fastened to a peripheral surface of the insulating region by a press connection or an adhesive connection.

A particularly compact configuration of the slip ring is rendered possible by the embodiment in which the contact regions overlap the insulating regions in regions.

In one advantageous embodiment, the openings have a larger diameter on the end face of the respective contact region than in the recess.

The openings reach from the respective end face of the contact region into the recess. The openings preferably have a circular cross section. The openings advantageously extend approximately in the axial direction. The openings preferably have a larger cross section on the respective end face than in the section plane with the recess.

The openings can be incorporated into the contact region by a machining production method, in particular by a drill procedure or a milling procedure. An enlarged recess can be embodied by a sinking process.

Owing to a cross section of the opening that is enlarged in regions, it is possible for the airflow to flow with a lower flow resistance through the opening.

In a further advantageous embodiment of the invention, the peripheral surface of the respective contact region has a larger radius than the insulating regions adjoining in each case.

The contact regions protrude beyond the insulating regions owing to the embodiment. The protrusion of the contact region beyond the respective insulating region forms the annular surface on the respective end surface of the contact region that is not covered by an insulating region.

The openings that are positioned in the region of the annular surface can guide the axially extending airflow particularly effectively into the recess.

In a further advantageous embodiment of the invention, the respective contact surface has a groove.

The groove is therefore advantageously used so as to further improve the cooling and therefore the cooling of the slip ring. Furthermore, a particularly uniform transmission of the electrical power from the respective slip ring element to the respective contact region is provided by the improved guiding of the slip ring element, Finally, a groove contributes to avoiding dust on the contact surface.

In a further advantageous embodiment of the invention, the slip ring is embodied so as to transmit at least 100 kilowatt, in particular at least one megawatt, preferably at least 5 megawatt.

In particular in the industrial environment or in the generation of energy, in general electrical powers in the region of hundreds of kilowatts up to in the region of a megawatt are transmitted to a rotor of an electric machine.

Accordingly, the slip ring that is described here and/or the slip ring unit that is described here are embodied so as to transmit an electrical power of at least 100 kilowatt, in particular 500 kilowatt, preferably at least one or multiple megawatt.

The slip ring that is described here and/or the slip ring unit that is described here are advantageously embodied for the long-term transmission of the above-mentioned electrical powers.

In a further advantageous embodiment, at least some of the openings extend through the contact region (5), wherein the openings are arranged in the radial direction in such a manner that the openings embody indentations on an underside of the recess.

For a particularly simple possibility of the production of the slip ring, in particular the contact regions, the openings of the respective contact region are in each case localized at the same tangential position.

It is preferred that at least some of the recesses are positioned in the radial direction in such a manner that the cross-sectional surface of the respective recess protrudes into the underside of the recess. The openings extend in this embodiment at least in part in the axial direction into the recess. The impressions in the underside of the recess are embodied by the overlap of the respective cross section of the opening with the underside of the recess.

It is preferred that the openings pass through the entire contact region in the axial direction. Furthermore, the respective cross-sectional surface of the opening perforates the underside of the recess, wherein the perforations embody the indentations.

The indentations are used so as to provide an airflow in the radial direction. The airflow that extends in the radial direction is preferably used to cool the slip ring elements more effectively.

In one advantageous embodiment of the invention, the openings extend obliquely through the contact region with respect to the axial direction.

It is preferred that the openings extend obliquely (in a crooked manner) with respect to the axial direction. The angle with respect to the axial direction can include between 2 and 30 degrees in the tangential direction and/or in the radial direction. The oblique extent of the opening in the contact region advantageously amplifies the airflow in the axial direction, in particular during a rotational movement of the slip ring.

The slip ring unit comprises at least one slip ring element, a stationary arrangement that is allocated to the respective slip ring element, and a slip ring that is described here, wherein the respective slip ring element is positioned by a stationary arrangement in such a manner that the slip ring element contacts a contact surface of the slip ring.

The stationary arrangement is used so as to position the slip ring elements. The slip ring elements are preferably positioned in such a manner that, during a rotational movement of the slip ring, the slip ring elements are applied to the respective contact surface. The slip ring elements are embodied so as to transmit the electrical power, in particular the rotor current, to the respective contact surface.

The slip ring elements are preferably embodied as slip ring brushes, Slip ring elements are preferably embodied from a metal such as bronze, brass, or stainless steel.

The stationary arrangement is preferably at least indirectly arranged on a stator of the electric machine. The electric machine preferably comprises windings on its rotor and current flows through said windings.

The respective slip ring element preferably likewise comprises a recess. The recess is preferably embodied in such a manner that the airflow penetrates into the recess and cools the cooling of the slip ring element more effectively. Furthermore, the slip ring element can be embodied in a two-part manner, wherein the respective parts of the slip ring are arranged spaced from one another. The airflow in this case goes through between the two parts of the slip ring element. An improved cooling of the slip ring element is achieved owing to the enlarged surface of the slip ring element and the airflow that extends in the radial direction.

The electric machine is embodied in particular as a generator for a wind turbine. The electric machine has a slip ring described here or a slip ring unit described here.

The electric machine is preferably embodied for drives in heavy industry and also for a generator in the power plant sector.

The wind turbine has a slip ring described here or a slip ring unit described here.

The slip ring or the slip ring unit is preferably used for the transmission of electrical power, in particular of the rotor current, to a rotatable element, in particular to a rotor.

BRIEF DESCRIPTION OF THE DRAWING

The invention is further described and explained below with reference to figures. The embodiments that are illustrated in the figures are only exemplary and do not limit the invention in any way. The features that are illustrated in the figures can be used individually or in combination to form new embodiments of the invention.

In the drawings.

DETAILED DESCRIPTION OF PREFERRED EMBODIMENTS

Figure 1:
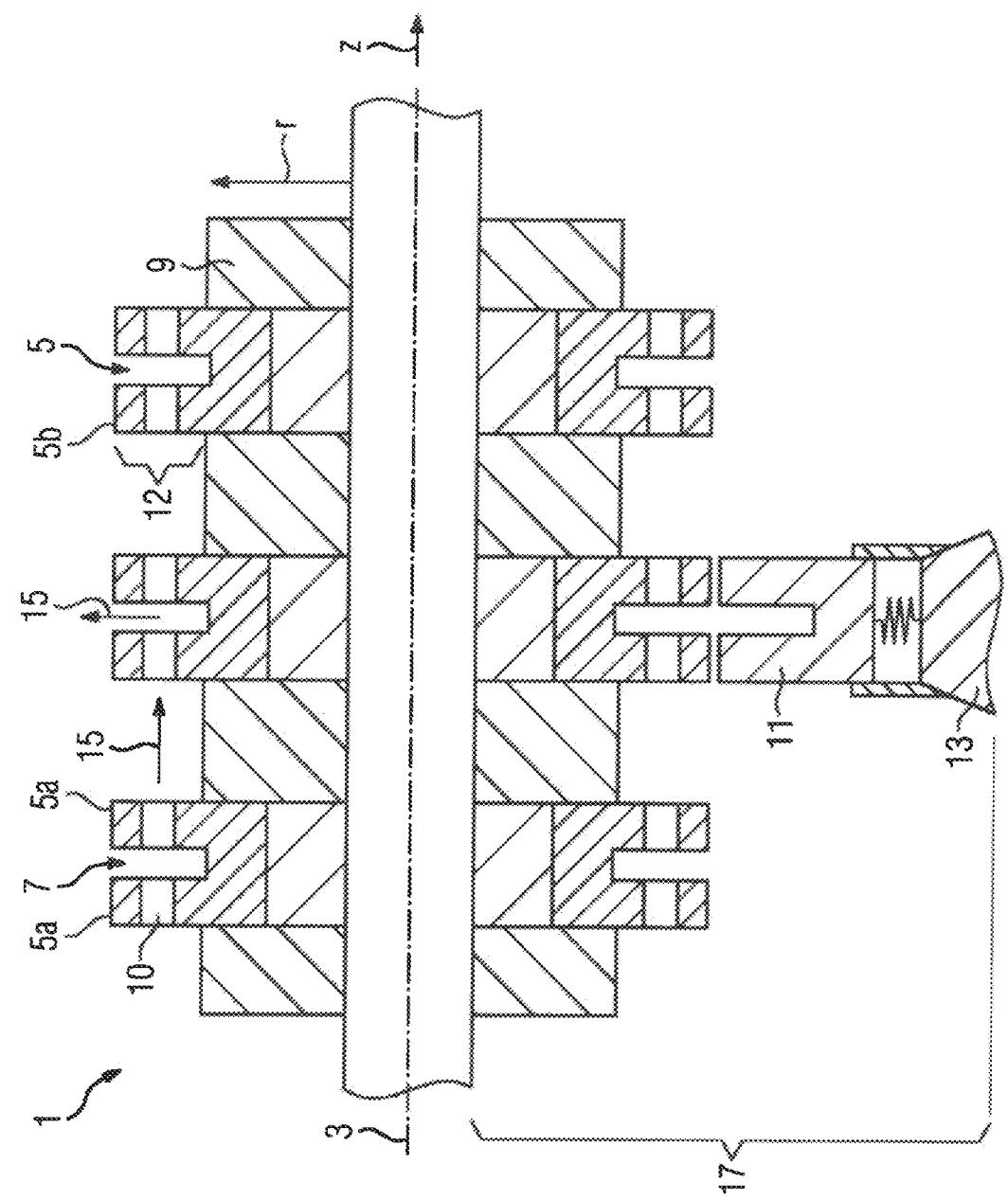
FIG. 1 shows a schematic diagram of a slip ring unit.

FIG. 1 illustrates a schematic diagram of a slip ring unit 17. The slip ring unit 17 comprises a slip ring 1, a slip ring element 11 and a stationary arrangement 13. The slip ring 1 is essentially embodied as rotationally symmetrical. The slip ring 1 comprises insulating regions 9 and contact regions 5, The insulating regions 9 and the contact regions 5 are arranged in the axial direction z on the axle 3. One embodiment of the slip ring 1 having three contact regions 5 is illustrated. The respective contact region 5 is used so as to transmit current, in particular a phase of a multiphase alternating current. The insulating regions 9 are used so as to insulate the contact regions 5, The respective contact region 5 has on its peripheral surface contact surfaces 5a. The contact surfaces 5a are in each case interrupted by the recess 7. The recess 7 extends in a tangential circumferential manner along the peripheral surface of the contact region 5. The respective contact surface 5a can have a groove 5b (not illustrated). The groove 5b is used preferably so as to improve cooling of the contact surface 5a. The groove 5b is however optional and not essential for the invention. The respective contact region 5 has an opening 10 on its exposed positioning surface. The opening 10 is used so as to transfer an airflow 15 from the outer side of the slip ring 1 into the recess 7 of the respective contact region 5. The axle 3 in this case extends in the axial direction z, wherein the slip ring 1 is connected in a non-rotatable manner to the axle 3. The axle 3 is used for the rotational movement of the slip ring 1.

The slip ring element 11 preferably likewise has a recess that is arranged in such a manner that the airflow 15 can flow in the radial direction r into the recess of the slip ring element.

An airflow 15 in the radial direction r is generated by the rotational movement of the slip ring 1, wherein the airflow 15 is used so as to cool the slip ring element 11 and so as to cool the inner surface of the respective recess 7. The slip ring 1 is consequently also cooled. The contact regions 5 are embodied at least in their outer region (the shaded region) from a material that conducts electricity effectively, in particular bronze. The respective insulating region 9 is conversely embodied in general from a solid plastic or a ceramic material.

It is preferred that the insulating regions 9 and the contact regions 5 are arranged adjacent to one another and are fastened to one another, wherein the respective contact regions 5 and the insulating regions 9 are connected to one another in a non-rotatable manner.

Figure 2:
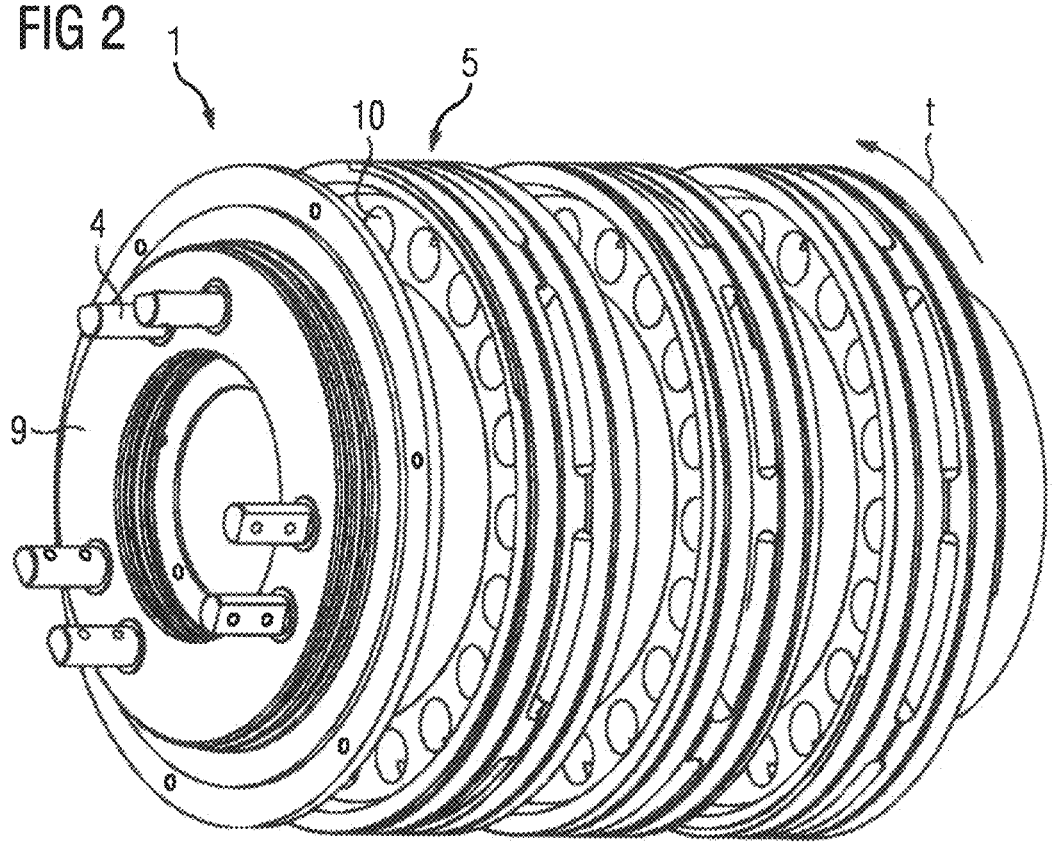
FIG. 2 shows an exemplary slip ring.

FIG. 2 illustrates an exemplary slip ring 1. The slip ring 1 that is illustrated here comprises three contact regions 5, wherein the respective contact region 5 is contacted on the respective axial end face by an insulating region 9, The respective contact region 5 has on its peripheral surface the recess 7 that is arranged centrally, wherein the recess 7 extends in the tangential direction t in a circumferential manner in the peripheral surface. In addition to the recess 7, a groove 5b extends on the respective contact surface 5a. The groove 5b is however not essential for the exemplary slip ring. Furthermore, openings 10 are illustrated, wherein the openings 10 are arranged on the respective end face of the contact region 5. The openings 10 extend in the axial direction z and issue in each case into the recess 7 of the respective contact region 7.

The slip ring 1 has on its front end surface contact elements 4. The contact elements 4 are electrically connected to the respective contact surface 5a of the respective contact region 5, The hole of the slip ring 1, which is visible in the center, is used so as to receive the axle.

Figure 3:
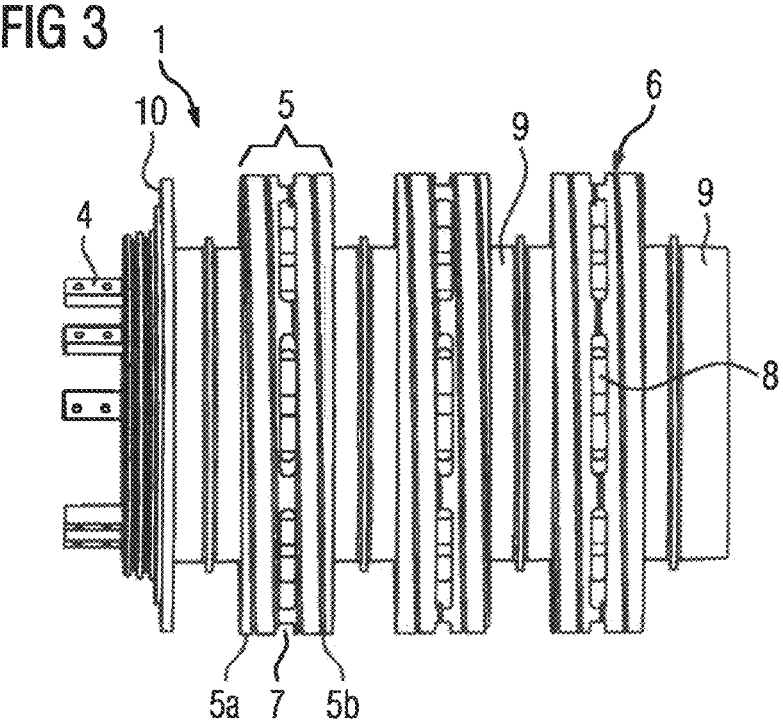
FIG. 3 shows an exemplary slip ring as a plan view.

FIG. 3 illustrates an exemplary slip ring in a plan view. The slip ring 1 comprises three contact regions 5 and the end faces of the insulating regions 9 are applied to said contact regions. The recess 7 of the contact region 5 is clearly visible, wherein the recess 7 is arranged in the center of the respective peripheral surface of the contact region 5. The contact region 5 has on its peripheral surface the contact surfaces 5a, wherein the contact surfaces 5a in each case have a groove 5b. The groove is used so as to guide a slip ring element 11 (illustrated in FIG. 1). The recess 7 has on its underside impressions 8 (marked black), wherein the impressions are embodied so as to amplify the radial airflow 15. The impressions can be produced by the arrangement of the openings 10 in the radial direction r. The openings 10 are arranged in the radial direction r in such a manner that the respective cross section of the opening protrudes into the underside of the recess and removes a part, namely the impression 8, so as to embody the impressions 8. The underside of the recess 7 is provided with impressions 8 by the impression 8. The underside of the impression 7 is embodied apart from the impressions 8 like a peripheral surface of a cylinder.

Figure 4:
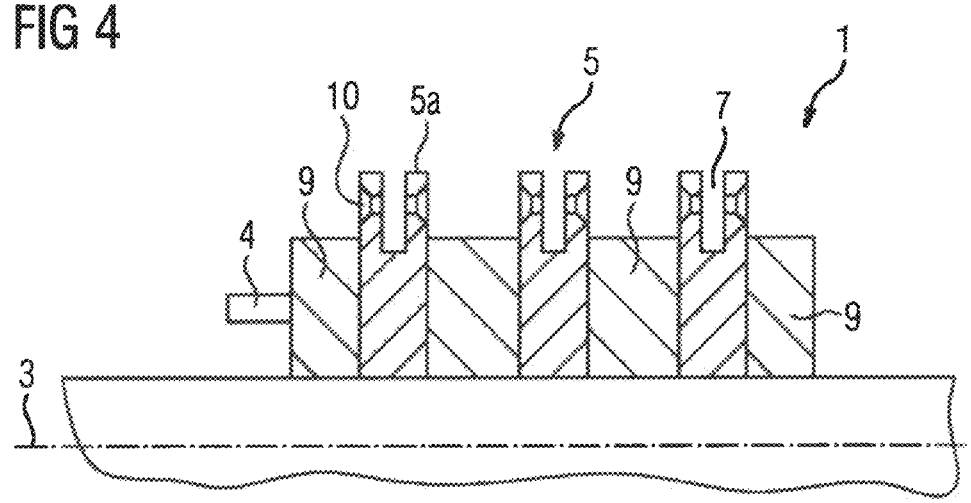
FIG. 4 shows a further sectional view of an exemplary slip ring, and also

FIG. 4 illustrates a sectional view of an exemplary slip ring 1. The slip ring 1 has contact elements 4 on its end face. It is characteristic for the slip ring 1 illustrated here that the openings 10 pass into the contact regions 5 in each case through the contact region. The respective cross-sectional surface of the opening 10 is enlarged on the end face of the contact region 5. The opening 10 is preferably embodied as essentially cylindrical. The opening 10 is embodied as enlarged on the respective end face. The airflow 15 can be transferred more effectively into the recess 7 owing to the enlarged diameter of the opening 10 on the outer side of the respective contact region 5.

Figure 5:
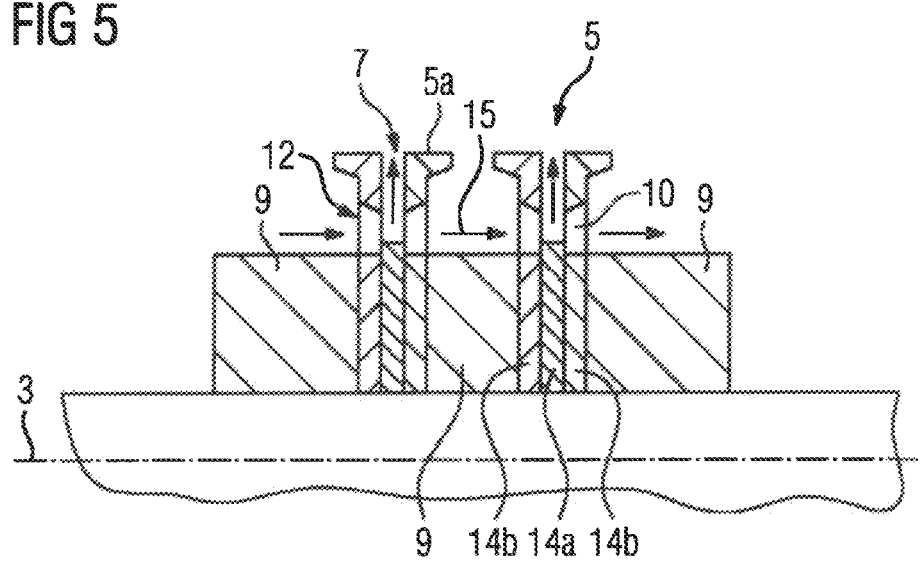
FIG. 5 shows a further sectional view of an exemplary slip ring.

FIG. 5 illustrates a further sectional view of an exemplary slip ring 1. The slip ring that is illustrated here only has two contact regions 5. The respective contact surface 5a is in this case embodied as wider than the contact region in the region of the axle 3. The contact surface 5a enlarged in each case is embodied by projections around the upper region (in the radial direction r) of the respective contact region.

Furthermore, the contact region 5 comprises three segments 14a, 14b that are embodied as essentially cylindrical. An intermediate segment 14a is arranged in the center between two covering segments 14b. The peripheral surface of the intermediate segment 14a forms the underside of the recess 7. The sides of the respective covering layer 14b that are not covered on the inner side of said covering layer form the sides of the recess 7. The recess 7 is provided by the larger radius of the respective covering layer 14b in comparison to the intermediate layer 14a.

The in each case outward-facing end faces of the respective covering layer 14 form the annular surface 12 in the region that is not covered by the insulating region 9. It is preferred that the openings 10 are positioned in the radial direction r in such a manner that the cross-sectional surface 10 of the respective opening 10 in part penetrates the underside of the recess and embodies the impression 8.

The intermediate segment 14a in the illustrated embodiment has a larger radius than the respective insulating region 9. Furthermore, the openings 10 are arranged directly on the radial underside of the annular surface 12. Accordingly, openings 10 that extend through the contact surface 5 form the impression 8 in the underside of the recess (the impression is not illustrated in FIG. 5 for the purpose of clarity).

In summary, the invention relates to a slip ring 1, a slip ring unit 17 and an electric machine in particular for use in a wind turbine. The slip ring 1 comprises insulating regions 9 and contact regions 5 that are arranged in each case between the insulating regions 9. The contact regions 5 are embodied in each case as cylindrical and have contact regions 5a on their peripheral surface. The contact regions 5a are separated by a shaped area 7 in the tangential direction t. The recess 7 extends as far into the contact region 5 so that openings 10 that lead in the axial direction z through the contact region 5 issue into the recess 7. An airflow 15 that extends in the axial direction z is transferred by the openings 10 into the recess 7 and is diverted into an airflow 15 in the radial direction r. Impressions 8 on the underside of the recess 7 amplify the airflow 15 in the radial direction r during a rotational movement of the slip ring 1. The airflow 15 is used so as to cool slip ring elements 11 and the inner face of the recess 7, wherein the slip ring elements 11 are provided so as to transmit electrical power, in particular the rotor current, to the slip ring 1.

The invention claimed is:

1. A slip ring, comprising:
   an axle extending in an axial direction;
   a contact region having a contact surface on a peripheral surface of the contact region and a recess extending in a tangential circumferential direction along the peripheral surface, said contact region including an axial end face formed with an opening which communicates with the recess and has a diameter that is larger at the end face of the contact region than at the recess, said contact region including three cylindrical segments which define two covering segments and an intermediate segment arranged in a center between the two covering segments, with the two covering segments and the intermediate segments constructed from individual parts, each of the two covering segments defining a radius which is larger than a radius of the intermediate segment so that a peripheral surface of the intermediate segment forms an underside of the recess; and
   an insulating region arranged adjacent to the contact region on the axle and contacting the contact region on the axial end face.

2. The slip ring of claim 1, wherein the axial end face of the contact region has an annular surface, said opening being formed in a part of the annular surface which part is not covered by the insulating region.

3. The slip ring of claim 1, wherein the axial end face of the contact region adjoins the insulating region.

4. The slip ring of claim 1, wherein the peripheral surface of the contact region has a radius which is larger than a radius of the adjoining insulating region.

5. The slip ring of claim 1, wherein the contact surface has a groove.

6. The slip ring of claim 1, constructed to transmit an electrical power of at least 1 megawatt.

7. The slip ring of claim 1, wherein at least a part of the opening extends through the contact region and is configured in a radial direction such as to form an impression on an underside of the recess.

8. The slip ring of claim 1, wherein the opening extends obliquely through the contact region with respect to the axial direction.

9. The slip ring of claim 1, wherein
the two covering segments each have a peripheral contact surface which is wider than an axial width of the covering segments proximal to the axle.

10. A slip ring unit, comprising:
a slip ring comprising an axle extending in an axial direction, a contact region having a contact surface on a peripheral surface of the contact region and a recess extending in a tangential circumferential direction along the peripheral surface, said contact region including an axial end face formed with an opening which communicates with the recess and has a diameter that is larger at the end face of the contact region than at the recess, said contact region including three essentially cylindrical segments which define two covering segments and an intermediate segment arranged in a center between the two covering segments, with the two covering segments and the intermediate segments constructed from individual parts, each of the two covering segments defining radius which is larger than a radius of the intermediate segment so that a peripheral surface of the intermediate segment forms an underside of the recess, and an insulating region arranged adjacent to the contact region on the axle and contacting the contact region on the axial end face;
a slip ring element; and
a stationary arrangement configured to position the slip ring element such as to contact the contact surface of the slip ring.

11. The slip ring unit of claim 10, wherein the axial end face of the contact region has an annular surface, said opening being formed in a part of the annular surface which part is not covered by the insulating region.

12. The slip ring unit of claim 10, wherein the end face of the contact region adjoins the insulating region.

13. The slip ring unit of claim 10, wherein the contact region is arranged on a peripheral surface of the insulating region.

14. The slip ring unit of claim 10, wherein the peripheral surface of the contact region has a radius which is larger than the adjoining insulating region.

15. The slip ring unit of claim 10, wherein the contact surface has a groove.

16. The slip ring unit of claim 10, wherein the slip ring is configured to transmit an electrical power of at least 1 megawatt.

17. The slip ring unit of claim 10, wherein at least a part of the opening extends through the contact region and is configured in a radial direction such as to form an impression on an underside of the recess.

18. The slip ring unit of claim 10, wherein the opening extends obliquely through the contact region with respect to the axial direction.

19. An electric machine, comprising:
a slip ring comprising an axle extending in an axial direction, a contact region having a contact surface on a peripheral surface of the contact region and a recess extending in a tangential circumferential direction along the peripheral surface, said contact region including an axial end face formed with an opening which communicates with the recess and has a diameter that is larger at the end face of the contact region that the recess, said contact region including three cylindrical segments which define two covering segments and an intermediate segment arranged in a center between the two covering segments, with the two covering segments and the intermediate segments constructed from individual parts, each of the two covering segments defining radius which is larger than a radius of the intermediate segment so that a peripheral surface of the intermediate segment forms an underside of the recess, and an insulating region arranged adjacent to the contact region on the axle and contacting the contact region on the axial end face; or
a slip ring unit as set forth in claim 10.

20. A wind turbine, comprising:
a slip ring comprising an axle extending in an axial direction, a contact region having a contact surface on a peripheral surface of the contact region and a recess extending in a tangential circumferential direction along the peripheral surface, said contact region including an axial end face formed with an opening which communicates with the recess and has a diameter that is larger at the end face of the contact region than at the recess, said contact region including three cylindrical segments which define two covering segments and an intermediate segment arranged in a center between the two covering segments, with the two covering segments and the intermediate segments constructed from individual parts, each of the two covering segments defining radius which is larger than a radius of the intermediate segment so that a peripheral surface of the intermediate segment forms an underside of the recess, and an insulating region arranged adjacent to the contact region on the axle and contacting the contact region on the axial end face; and
a slip ring unit as set forth in claim 10.

* * * * *